(No Model.)
C. S. LOCKWOOD.
ELECTRIC REGISTER FOR FLUID RESERVOIRS.
No. 300,490. Patented June 17, 1884.
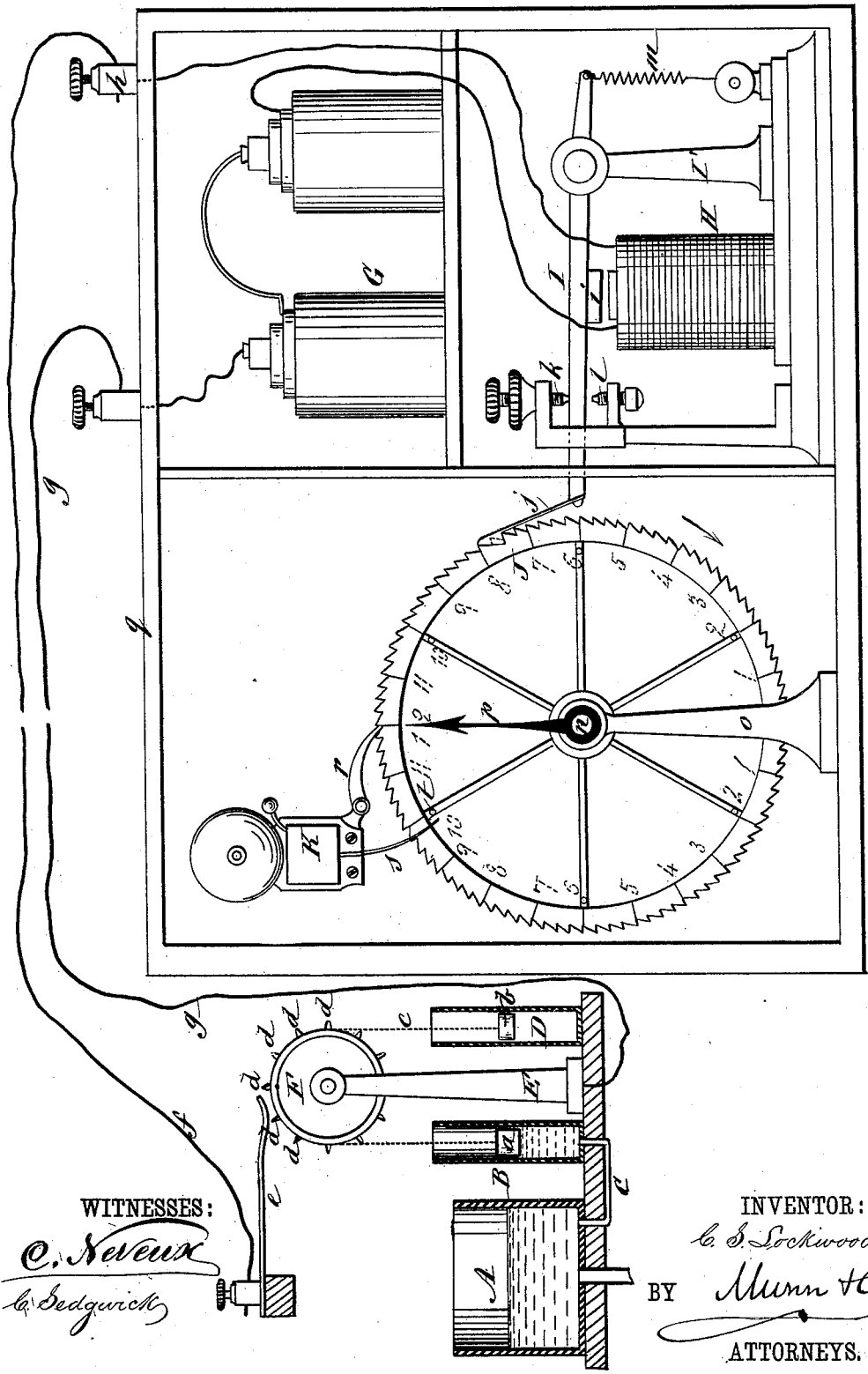
WITNESSES:
C. Neveux
C. Sedgwick
INVENTOR:
C. S. Lockwood
BY Munn & Co
ATTORNEYS.

UNITED STATES PATENT OFFICE.

CHARLES S. LOCKWOOD, OF NEWBURG, NEW YORK.

ELECTRIC REGISTER FOR FLUID-RESERVOIRS.

SPECIFICATION forming part of Letters Patent No. 300,490, dated June 17, 1884.

Application filed February 4, 1884. (No model.)

*To all whom it may concern:*

Be it known that I, CHARLES S. LOCKWOOD, of Newburg, in the county of Orange and State of New York, have invented a new and Improved Electric Register for Fluid-Reservoirs, of which the following is a full, clear, and exact description.

The object of my invention is to provide electro-mechanical means for registering the height of water or other fluid in a reservoir at a point distant from the reservoir.

My invention consists in apparatus actuated by the rise and fall of the fluid in the reservoir, and adapted to make and break an electric circuit, which circuit is connected with electro-mechanical registering mechanism at a distant point, as will be hereinafter described and claimed.

My invention is more particularly applicable to water-reservoirs, and will therefore be described in this connection.

Referring to the accompanying drawing, the reservoir A is connected with a stand-pipe, B, by a pipe, C, so that water in the stand-pipe and reservoir will stand at the same level. Near the stand-pipe B, and parallel with it, is placed a vertical pipe, D, and between the two pipes B D there is a vertical standard, E, at the top of which is journaled a wheel, F, whose diameter is equal to the distance between the centers of the pipes B D. In the stand-pipe B is placed a float, *a*, and in the pipe D a weight, *b*, which is lighter than the float *a*, and the float *a* and weight *b* are connected by a cord, *c*, running over the wheel F. The cord *c* passes around the wheel, and is fastened to it at some point to insure the positive rotation of the wheel. Contact-points *d* project from the periphery of the wheel F at equal intervals in position to engage a contact-spring, *e*, held by a fixed support and connected with the wire *f*. A wire, *g*, is in electrical communication with the wheel F through the standard E, and the wires *f g* extend to a distant point, where the wire *g* communicates with the battery G, and the wire *f* is connected through the binding-post *h* with one of the terminals of an electro-magnet, H, whose outer terminal is connected with the battery G, completing the electric circuit. A lever, I, pivoted in the standard I', extends over the poles of the electro-magnet H, and carries an armature, *i*, to be acted on by the magnet, and has attached to its longer arm a spring-pawl, *j*, which engages the teeth of a ratchet-wheel, J. Above and below the longer arm of the lever I there are adjusting-screws *k l*, for limiting the motion of the said lever, and to the shorter arm of the lever I is attached a spiral spring, *m*, for returning the said lever to its normal position after each operation of the electro-magnet H. The ratchet-wheel J is mounted on a shaft, *n*, journaled in standards *o*, and carrying the index *p*, which moves in front of a dial whose figures are shown in dotted lines, and indicates the movement of the ratchet-wheel J, which, together with other parts of the apparatus, is inclosed in the casing *q*. A pawl, *r*, pivoted on a fixed support, prevents retrograde motion in the ratchet-wheel J. Above the wheel J is placed a bell, K, of ordinary construction, having an arm, *s*, extending into the path of the pin *t*, so that the pin may engage the arm *s* and ring the bell. The pin *t* may be shifted to any of the holes in the spokes of the wheel adapted to receive it, so that the time of ringing the bell K may be varied.

When the float *a* is elevated by the rise of the water in the stand-pipe B, the weight *b*, acting through the cord *c*, turns the wheel F and brings one after the other of the contact-points *d* into contact with the spring *e* and completes the electric circuit through the magnet H, and the continued forward movement of the wheel carries each point away from the spring, breaking the electric circuit. When the water recedes in the stand-pipe B, the float *a* falls and the wheel F is revolved in the opposite direction, but alternately making and breaking the circuit, as before. Each make and break of the circuit draws down the armature of the electro-magnet and moves the ratchet-wheel J forward, one tooth indicating, by means of the index *p*, that the water has risen or fallen through a distance represented by one tooth of the wheel F, and in whichever direction the wheel F revolves the effect on the wheel J is the same, always moving it forward one tooth for each contact between the points *d* and spring *e*. The following will serve as an example: We will suppose the reservoir to be full—say twelve feet—as shown in the drawing, and the pump stopped. Now, the decreasing figures 11 to 0 indicate the quantity of water running out, and if the water has fallen five feet the wheel will have turned to the figure "7" on the left-hand side. Thereupon the engineer starts his pump to fill the reservoir again, and turns the wheel around to the "7" on the right of the wheel, or, in other words, to the "7" of the increasing numerals, when he will know that every notch registered by the wheel will indicate the depth caused by the flowing in of the water, and after the pump has ceased to operate he will of course know that the rotation of the wheel indicates the fall of the water. A pump will be used, of course, which can force the water into the reservoir faster than it can run out. By increasing or decreasing the circumference of the wheel and the number of notches and numerals, it may be made to serve with reservoirs of various capacities. Pumping into the reservoir A continues until it is filled, and the pin $t$ and bell-arm $s$ are arranged in relation to each other so that the bell will ring when the reservoir is full. The index $p$ will then point to figures indicating the greatest depth of water the reservoir is capable of holding. The figures on the dial from this point on are arranged in inverse order down to the zero, to represent the decrease in the depth of water as the reservoir is emptied.

My improved registering apparatus is applicable to water-reservoirs, oil-tanks, gasometers, and other forms of reservoir for holding fluids. When applied to gasometers, the stand-pipe B will be dispensed with, and the cord $c$ will be attached directly to the containing-vessel of the gasometer, which is the equivalent of the float $a$.

Having thus described my invention, what I claim as new, and desire to secure by Letters Patent, is—

1. In an electric register for fluid-reservoirs, the combination, with the float $a$, opposing weight $b$, and cord $c$, of the circuit-operating wheel F and contact-spring $e$, the said wheel and spring being interposed in an electric circuit communicating with a distant point, as specified.

2. The combination of the circuit-operating wheel F, float $a$, weight $b$, cord $c$, contact-spring $e$, circuit-wires $f\ g$, and electro-mechanical registering mechanism, as described.

3. The combination of the electro-magnet H, armature-lever I, pawl $j$, ratchet-wheel J, and circuit-controlling mechanism operated by the float $a$, as described.

CHARLES S. LOCKWOOD.

Witnesses:
J. N. WEED,
JAMES MITCHELL.